United States Patent
McAlpin

[15] 3,673,554
[45] June 27, 1972

[54] DEPTH SOUNDER DIGITIZER

[72] Inventor: Silvan E. McAlpin, Dallas, Tex.

[73] Assignee: Mobil Oil Corporation

[22] Filed: Sept. 30, 1969

[21] Appl. No.: 862,204

[52] U.S. Cl. .............................................. 340/3 R, 340/1 C
[51] Int. Cl. .......................................................... G01s 9/68
[58] Field of Search ................... 340/1 C, 3 R; 343/7 RS, 7.3

[56] References Cited

UNITED STATES PATENTS

| | | | |
|---|---|---|---|
| 2,568,926 | 9/1951 | Moran, Jr. | 340/1 C |
| 3,344,421 | 9/1967 | Dildy, Jr. | 340/3 |

Primary Examiner—Richard A. Farley
Attorney—William J. Scherback, Frederick E. Dumoulin, Arthur F. Zobal, Andrew L. Gaboriault and Sidney A. Johnson

[57] ABSTRACT a water depth digitizer produces an averaged digital readout synchronized with an external clock. The digital readout is produced from a depth sounder having a timing cycle which is asynchronous with respect to the clock. A digital counter is started in response to the occurrence of selected acoustic ranging pulses. Pulses which are proportional in time to the velocity of sound in water are counted until the returned echo from the sea bottom stops the count. Ten counts are accumulated in the digital counter which is arranged to count in decades. The least significant decade is dropped to produce a readout directly representing water depth.

4 Claims, 6 Drawing Figures

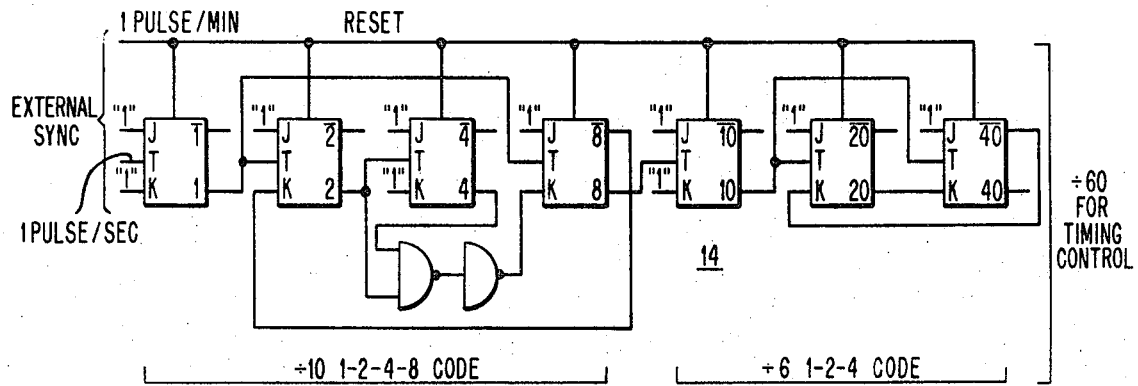
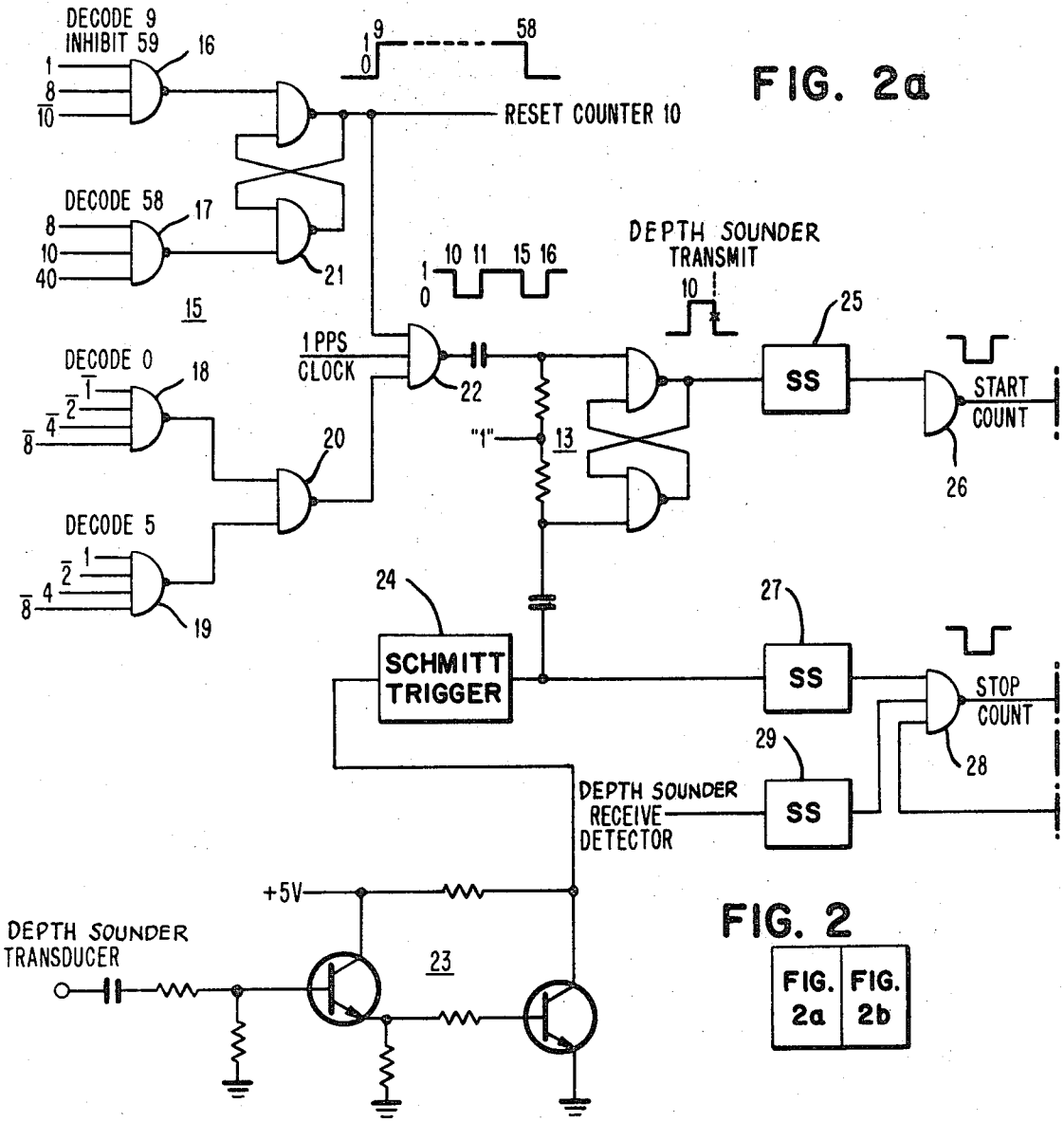
FIG. 2a
FIG. 2
| FIG. 2a | FIG. 2b |

…

DEPTH SOUNDER DIGITIZER

BACKGROUND OF THE INVENTION

This invention relates to a digitizer for a water depth sounder and more particularly to a digitizer which produces an averaged digital readout synchronized with an external clock.

Depth sounders which measure the time of return of acoustic ranging pulses have been successfully used to accurately measure water depth. Recently, there has been a trend toward automation in hydrographic survey and oceanography which requires the automatic readout of depth from the depth sounder. "Digital Readout Echo Sounder" by C. H. Cook, Proceedings of the IERE Conference on Electronic Engineering and Oceanography, 1966, describes a system for automatic readout of depth from an echo sounder. Also, U.S. Pat. Nos. 3,307,143, Wyse et al., and 3,344,421, Dildy, Jr., describe digital readout systems for echo ranging type devices.

A requirement exists for a digitizer which produces a readout averaged over a plurality of depth sounder soundings. For example, Brown et al. U.S. Pat. No. 3,263,206 describes a method for determining time averaged depth with an analog measurement. This need particularly exists when the depth sounder is operated in conjunction with geophysical exploration equipment. For example, in making a gravity survey, the gravity data is averaged over a time period —for example, one minute. It is desirable to concurrently accurately measure water depth averaged over the same time period.

SUMMARY OF THE INVENTION

In accordance with an important aspect of the present invention, an averaged digital readout synchronized with an external clock is obtained from a depth sounder producing acoustic ranging pulses in a timing cycle which is asynchronous with respect to the external clock. Since the averaged depth sounder readout is synchronized with the external clock, it can be recorded in accurately timed relation to other geophysical measurements, such as gravity measurements, which are synchronized with the external clock.

In a particular embodiment, logic circuitry starts a digital counter in response to the time occurrence of selected acoustic ranging pulses. The digital counter is stopped by the receipt of echoes from these selected acoustic ranging pulses.

The digital counter counts pulses which are proportional in time to the velocity of sound in water. The counts from ten acoustic ranging pulses are accumulated in the counter. The digital readout of the counter is arranged in decades with the least significant decade being ignored in the readout so that this readout accurately represents water depth averaged over ten depth sounder soundings.

A receive gate timer generates a window during which the returned echo is expected. The timer is reset by the received echo so that the window automatically tracks the bottom within a preset limit of water depth change.

DESCRIPTION OF A PARTICULAR EMBODIMENT

Figure 1:
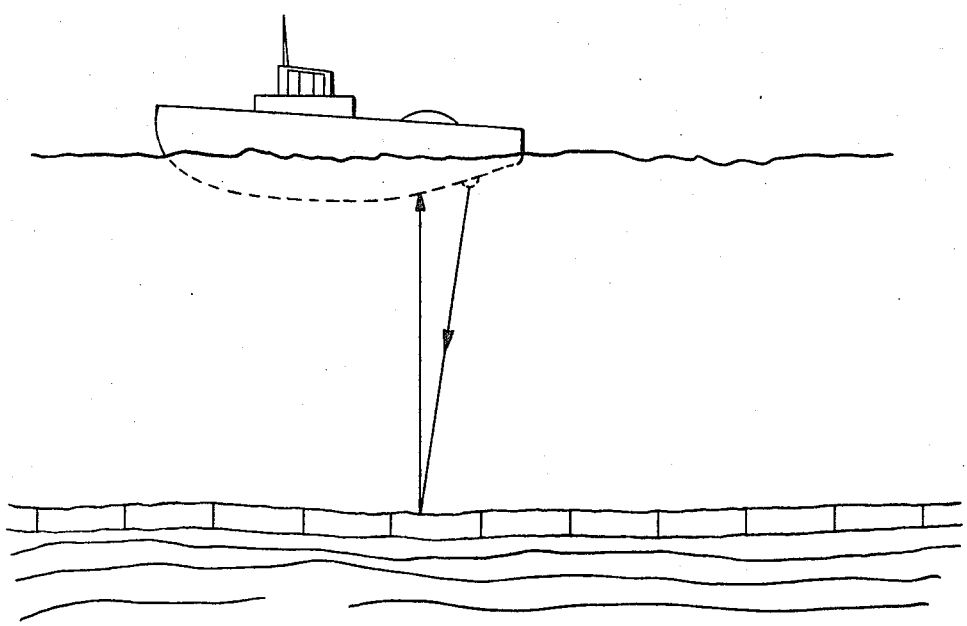
FIG. 1 depicts the depth sounder in use during a marine geophysical exploration.

FIG. 1 depicts the depth sounder in use on a boat making a seismic survey. The depth sounder includes a transducer 70 which produces periodic acoustic ranging pulses and produces a receive signal representing the return of a reflected acoustic ranging pulse. A depth sounder suitable for use with the digitizer of the present invention may be any commercial type with a sounding rate of 30 soundings per minute or higher.

This type of depth sounder is asynchronous, that is, it operates on its own timing cycle and is not synchronized with an external clock. The problem is to obtain an averaged digital readout from the depth sounder which is synchronized with the external clock. The digitizer now to be described will produce a digital readout representing the average of ten depth sounder readings occurring in a one minute period which is synchronized to the external clock.

Figure 2B:
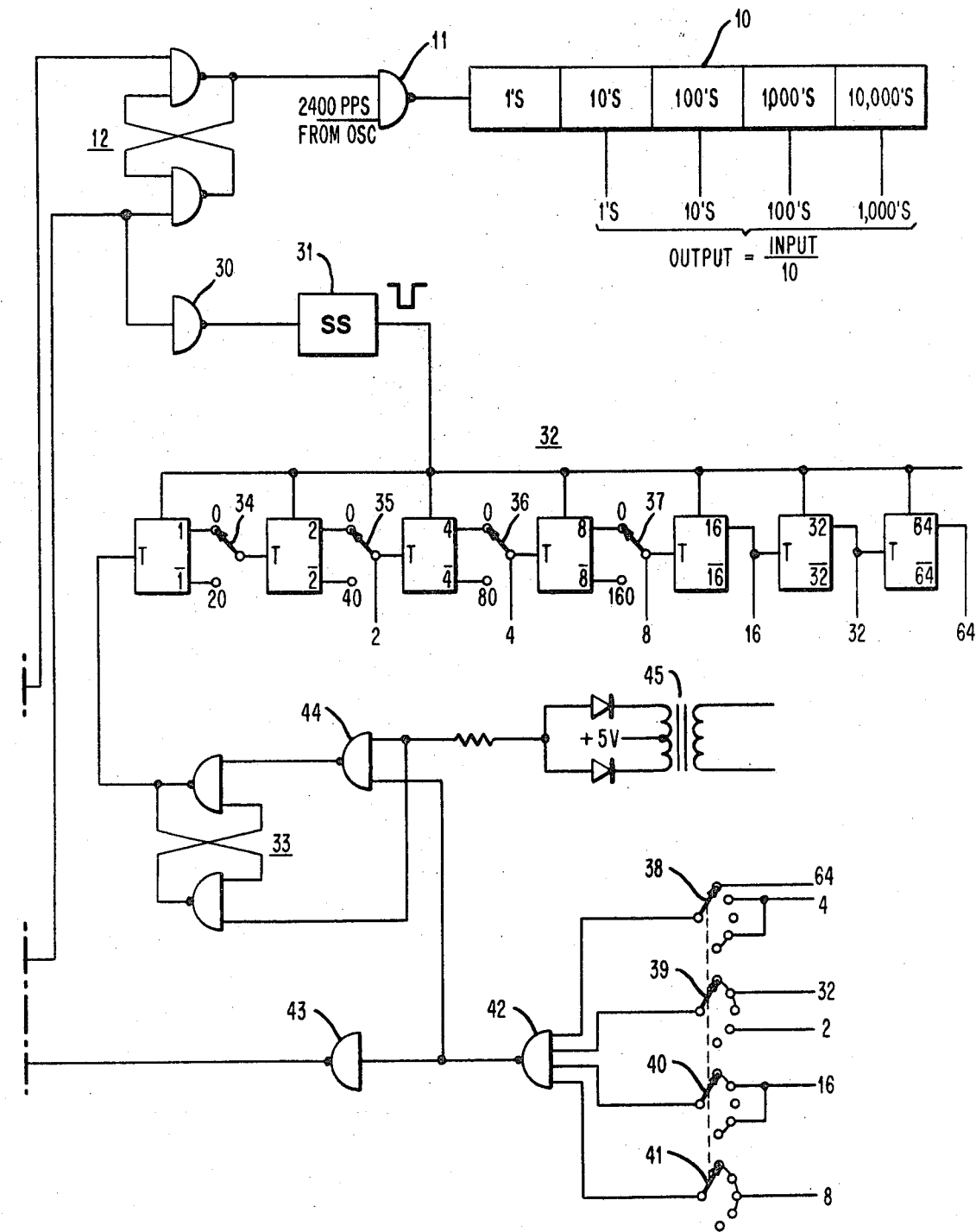
FIG. 2 shows the manner in which FIGS. 2a and 2b fit together to form a logic diagram of the digitizer of this invention.

Refer now to the logic diagram of FIGS. 2a and 2b. In this diagram, the gating circuits are NAND gates. The flipflops have the standard capability of being steered by the J and K inputs and being toggled by the T input. All logic circuits are commercially available. For example, Motorola integrated circuits are suitable for use.

The digital counter 10 produces a digitized output representing water depth. The counter includes five decades. Because a reading averaged over 10 depth sounder pulses is obtained by the system of the present invention, the least significant digit is ignored so the four more significant decades provide a digitized output representing water depth. When the NAND gate 11 is enabled, the digital counter counts pulses which are proportional in time to the velocity of sound in water, in this case, 2,400 pulses per second.

The logic circuitry for enabling the counter includes a first bistable circuit 12 which enables NAND gate 11 when the bistable circuit is set.

A second bistable circuit 13 is set in response to selected pulses from an external clock. This external clock produces major timing pulses at one pulse per minute and minor timing pulses at one pulse per second. These pulses from the external clock are applied to the timing control counter 14. The timing control counter 14 is reset by the major timing pulses at one pulse per minute. In the interval between major pulses, the counter 14 counts one pulse per second pulses. The stages of the timing control counter 14 are connected to divide by sixty for timing control. Note that the first four stages are connected to divide by ten and the last three stages are connected to divide by six.

The outputs of the timing control counter 14 are applied to the decoding circuit 15 which included NAND gates 16 - 20 and bistable circuit 21. The NAND gate 16 decodes a count of nine in the timing control counter 14. This sets the bistable circuit 21 at a count of nine. The NAND gate 17 decodes a count of 58 in the timing control counter 14. This resets the bistable circuit 21. Therefore, the bistable circuit 21 applies to the NAND gate 22 a signal which enables the NAND gate at a count of nine and inhibits it at a count of 58. The output of bistable circuit 21 is also applied to reset digital counter 10 at a count of 9 in the timing control counter 14.

The NAND gate 18 decodes 0, 10, 20, etc. The NAND gate 19 decodes 5, 15, 25, etc. These signals are applied through NAND gate 20 to the NAND gate 22. Also applied to NAND gate 22 are one pulse per second pulses from the external clock. The NAND gate 22 is enabled at counts of the timing control counter of 10, 15, 20, 25, 30, 35, 40, 45, 50 and 55. Pulses from the external clock at these ten selected times pass through NAND gate 22 to set the second bistable circuit 13.

The second bistable circuit 13 is reset by pulses representing the time occurrence of the acoustic ranging pulses from the depth sounder. The depth sounder transmit pulse is applied through amplifier 23 to the Schmitt trigger 24. The Schmitt trigger 24 resets the second bistable circuit 13.

When the second bistable circuit 13 is reset by the depth sounder transmit pulse, the 2 millisecond single shot multivibrator 25 is triggered. This applies a start pulse through NAND gate 26 to set the first bistable circuit 12 thereby enabling the digital counter 10 to start counting.

The digital counter 10 is stopped by the receive signal which is derived from the depth sounder receiver. The output of the depth sounder is amplified in several amplifying stages not shown and the output triggers a 1 m. sec. delay single shot which is not shown. After 1 m. sec., the 0.1 m. sec multivibrator 29 generates the receive signal which passes through receive gate 28 to stop the counting of the digital counter 10. The 1 m. sec. delay in the depth sounder receive channel insures that the transmit pulse (which also appears on this channel) won't pass through the gate 28. Note that the gate 28 is inhibited by the output of single shot 27 for 6 m. sec. after the transmit pulse.

The output of a receive gate timer is applied to the lower input of the receive gate 28. This arrangement gates out middle water echoes caused by, for example, schools of fish. It enhances the reliability that the returned echo is from the sea bottom and not a spurious signal from something between the surface and the bottom. The receive gate timer generates a window during which the echo can be received and it is adjusted for the time when an echo is expected. Once set, the window then automatically tracks the bottom within a preset limit of change in water depth from one sounding to the next.

The receive signal passes through gate 30 to trigger the single shot multivibrator 31 which resets the receive gate timer 32. The receive gate timer 32 counts 120 pulse per second pulses from the bistable circuit 33.

The clock pulses for the receive gate timer are derived from the transformer 45 which is supplied from the same power source which drives the depth sounder timer motor. Therefore, variations in power line frequency are nullified since the effect is the same for the depth sounder repetition rate and the receive gate timer.

The switches 34 – 37 allow the selection of the time width of the receiver gate. Gate widths of 0 to 300 feet can be selected in increments of 20 feet since the 120 pulse per second clock corresponds to 20 feet per pulse.

The outputs of the receive gate timer counter 32 are applied through gang switches 38– 41 to the NAND gate 42. The switches 38– 41 permit the selection of the time period after reset that the receive gate occurs. The output of the NAND gate 42 is applied through the circuit 43 to the receive gate circuit 28.

The timer counter 32 is reset on the receive signal, that is, at the time of receipt of the echo pulse. Therefore, counter 32 always starts counting at the 120 pulse per second rate until the four input NAND gate 42 decodes the count corresponding to the depth sounder sounding rate as selected by the gang switches 38– 41. When this count is reached, receive gate 28 is enabled. At the same time, the output of NAND gate 42 inhibits the gate 44 to prevent further pulses from being applied to the counter 32. The switches 34– 37 between flipflops in the timer counter 32 allow the counter to be reset to zero or to an advanced count in one count (20 foot) increments to a total of 15 counts (300 feet). This allows adjustment of the time the receiver gate opens before an echo is expected.

Figure 3A:
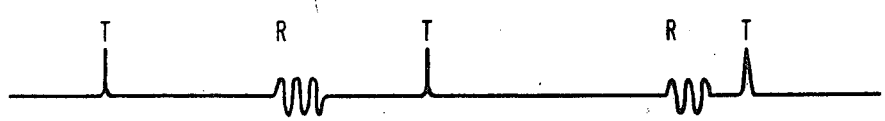
FIGS. 3a and 3b are waveforms depicting the operation of the receive gate timer.
Figure 3B:

The operation of the receive gate timer can be understood with reference to FIG. 3a showing the transmit and receive pulses and FIG. 3b showing the output of NAND gate 43. The depth sounder operates at a constant repetition rate, i.e., a constant number of acoustic ranging pulses per minute for any one particular depth scale. Since transmit pulses are evenly spaced in time, the received echoes will also be fairly evenly spaced in time. The receive gate timer resets at the time a received echo occurs. Upon resetting, the timer closes the receive gate 28 so that transmission of spurious signals is no longer possible. The timer cycle is set to be slightly less than the time interval determined by the repetition rate of the depth sounder. At the end of the timer cycle, the receive gate is opened and, when the received echo arrives, it passes through the gate 28. The received echo resets the receive gate timer counter 32 and a new cycle commences. Since the receive gate resets and commences a timed gating cycle at the time of occurrence of each succeeding received echo, the gating action tracks the received echo automatically.

The positions of gang switches 38– 41 for different depth sounder cycles is as follows:

| Position | | | |
|---|---|---|---|
| 1 for 1 | sec/cycle | (60 soundings/min.) | |
| 2 for ½ | " " | (120 " " ) | |
| 3 for ⅓ | " " | (180 " " ) | |
| 4 for ¼ | " " | (240 " " ) | |
| 5 for 1/6 | " " | (360 " " ) | |

While a particular embodiment of the invention has been shown and described, it will be understood that various modifications may be made without departing from the true spirit and scope of the invention. The appended claims are, therefore, intended to cover any such modifications.

What is claimed is:

1. A water depth digitizer producing an averaged digital readout from a depth sounder operating on its own timing cycle for producing acoustic ranging pulses, said depth sounder including a transducer producing a receive signal representing the return of a reflected acoustic ranging pulse, comprising:
   an external clock,
   a digital counter producing a digitized readout synchronized with said external clock and representing water depth,
   a first bistable circuit which enables said counter when said bistable circuit is set, and
   a second bistable circuit set in response to selected pulses from said external clock and reset by pulses representing the time occurrence of said acoustic ranging pulses, said first bistable circuit being set when said second bistable circuit is reset to enable said counter to start counting, said receive signal being applied to reset said first bistable circuit thereby stopping said counter.

2. The digitizer recited in claim 1 wherein said external clock produces major timing pulses and minor timing pulses synchronized with, but at a faster repetition rate than, said major timing pulses, said digitizer further comprising:
   a timing control counter, said minor timing pulses being applied to said timing control counter, and
   a decoding circuit, the outputs of said timing control counter being applied to said decoding circuit, said decoding circuit being connected to set said second bistable circuit a selected number of times between major timing pulses so that said digital counter accumulates a digital readout representing the time interval between the selected number of acoustic ranging pulses and their corresponding receive signals, said digital counter being reset once per major timing cycle.

3. The digitizer recited in claim 2 wherein said digital counter when enabled counts pulses which are proportional in time to the velocity of sound in water, said decoding circuit being connected to set said second bistable circuit in response to ten minor timing cycles occurring between successive major timing pulses so that the digital readout of said digital counter, ignoring the least significant digit of said readout, represents average water depth.

4. The digitizer recited in claim 1 further comprising:
   a receive gate, said receive signal being applied to said receive gate, and
   a receive gate timer, said receive gate timer being reset upon receipt of said receive signal, said receive gate timer producing a selectable time width gating signal a selectable period of time after being reset, said gating signal being applied to said receive gate to enable the transmission of said receive signal through said gate to reset said first bistable circuit.

* * * * *